US010943588B2

(12) United States Patent
Castelli et al.

(10) Patent No.: US 10,943,588 B2
(45) Date of Patent: Mar. 9, 2021

(54) METHODS AND SYSTEMS FOR MANAGING VOICE RESPONSE SYSTEMS BASED ON REFERENCES TO PREVIOUS RESPONSES

(71) Applicant: INTERNATIONAL BUSINESS MACHINES CORPORATION, Armonk, NY (US)

(72) Inventors: Vittorio Castelli, Croton-on-Hudson, NY (US); Shikhar Kwatra, Durham, NC (US); John Wilson, League City, TX (US); Sarbajit Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 16/239,339

(22) Filed: Jan. 3, 2019

(65) Prior Publication Data

US 2020/0219497 A1 Jul. 9, 2020

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
CPC .............. G10L 15/22; G10L 15/1822; G10L 2015/223; G10L 2015/225; G10L 17/22; G10L 15/30; G06F 16/3329; G06F 3/167
See application file for complete search history.

(56) References Cited

U.S. PATENT DOCUMENTS

| 6,415,257 | B1 * | 7/2002 | Junqua | H04N 5/44543 348/E5.105 |
| 2007/0299949 | A1 | 12/2007 | MacBeth | |
| 2009/0138269 | A1 * | 5/2009 | Agarwal | H04M 3/58 704/270.1 |
| 2016/0098992 | A1 | 4/2016 | Renard | |
| 2018/0032585 | A1 | 2/2018 | Kadiyala | |
| 2018/0047391 | A1 * | 2/2018 | Baik | G10L 25/57 |
| 2018/0322961 | A1 * | 11/2018 | Kim | G06N 3/08 |
| 2020/0074993 | A1 * | 3/2020 | Lee | G10L 15/22 |

* cited by examiner

*Primary Examiner* — Huyen X Vo
(74) *Attorney, Agent, or Firm* — Griffiths & Seaton PLLC (57) ABSTRACT

Embodiments for managing a voice response system by one or more processors are described. At least one communication from an individual is received. A reference to a previous response executed by a voice response system is identified within the at least one received communication. A response to the at least one received communication is determined based on the previous response executed by the voice response system.

21 Claims, 6 Drawing Sheets

METHODS AND SYSTEMS FOR MANAGING VOICE RESPONSE SYSTEMS BASED ON REFERENCES TO PREVIOUS RESPONSES

BACKGROUND OF THE INVENTION

Field of the Invention

The present invention relates in general to computing systems, and more particularly, to various embodiments for managing voice response systems based on, for example, references to previous responses included in received communications.

Description of the Related Art

Voice response systems, also known as chatbots, talkbots, chatterbots, bots, instant messaging (IM) bots, interactive agents, Artificial Conversational Entities (ACEs), etc., are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions and provide commands, and the voice response system may respond (e.g., answer a question, perform an action, etc.) based on its knowledge base and/or by analyzing the question/command, providing the best response it can generate.

However, unlike when providing requests (or commands) and/or asking questions to humans, voice response systems generally do not take into consideration similar commands (or questions) that were previously received and/or the responses that were executed as a result.

SUMMARY OF THE INVENTION

Various embodiments for managing voice response systems by one or more processors are described. In one embodiment, by way of example only, a method for managing a voice response system, again by one or more processors, is provided. At least one communication from an individual is received. A reference to a previous response executed by a voice response system is identified within the at least one received communication. A response to the at least one received communication is determined based on the previous response executed by the voice response system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, voice response systems, also known as chatbots, talkbots, chatterbots, bots, instant messaging (IM) bots, interactive agents, Artificial Conversational Entities (ACEs), etc., are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions and provide commands, and the voice response system may respond (e.g., answer a question, perform an action, etc.) based on its knowledge base and/or by analyzing the question/command, providing the best response it can generate.

However, unlike when providing requests (or commands) and/or asking questions to humans, voice response systems generally do not take into consideration similar commands (or questions) that were previously received and/or the responses that were executed as a result.

That is, when asking another human to perform a task, an individual may include in their communication (e.g., a spoken request/command) a reference to a similar, previously performed task. For example, if an individual asks another to buy some items at a store, in order to clarify or simplify the instructions, the individual may indicate that they want to same items that the other person bought at the store on a previous trip, if so desired (e.g., "Let's make the same meal we ate at our neighbor's house last weekend. Will you go to the grocery and buy those ingredients?").

As another example, a parent may tell their child to perform some chores. Instead of specifying each of the tasks and/or the exact manner in which the tasks should be performed, the parent may simply generally refer to a previous day on which the child performed chores (e.g., "If you want your allowance for the week, you have to do the same house work today that you did last Saturday.").

Current voice response systems may not be capable understanding such references to previously performed tasks (or generated responses). As such, the individual (or user) may have to specify the exact tasks (or actions) they want performed or executed and/or particular details about the tasks.

Thus, there is a need for methods and systems for managing chatbot (or voice response) systems that, for example, are capable of identifying and/or understanding references to previously executed responses that are included in received communications (e.g., voice commands, questions, etc.).

To address these needs, some embodiments described herein provide methods and systems for managing (or controlling) voice response systems (or chatbots) with the ability to identify and/or understand references included in received communications (e.g., voice communications and/or text-based communications) and generate responses (e.g., voice replies, actions, etc.) based on previously generated responses and/or data sources associated with the previously generated responses (and/or the received communications and/or individuals).

In some embodiments, when submitting (or providing) a communication (e.g., voice communication or text-based communication), such as a command or question, to the voice response system the user may include a reference to a response (e.g., auditory response, action performed, etc.) previously generated (or executed) by the voice response system (or another voice response system). The reference may be a "historical" reference, such as a specific date (and/or time), a range of dates/times, approximate dates/times, etc. The system may analyze the communication, identify the reference, and search an activity or execution log (associated with the appropriate voice response system) to locate details related to the executed response, and then generate the appropriate response (e.g., in the same manner as the previous response). It should be noted that the methods and systems described herein may be applied to both requests/commands for actions to be performed by computing (or IoT) devices and questions/queries provided to a voice response system.

The communication provided by the user may include a reference to one or more events, may be specific to a particular location, and/or may be associated with another individual (e.g., another individual's voice response system, social media activity, surrounding context when a voice command was provided, etc.). The system (i.e., the voice response system receiving the communication) may analyze the reference data and accordingly identify the response (or command) to be executed.

In some embodiments, if the system is not able to identify the reference and/or the reference is determined to be ambiguous, the system may generate responses that include requests for additional information and/or clarification of the reference(s) (and/or the communication as a whole). That is, the system may ask the user for help or additional information so that that system may understand (and/or determined and/or identify) the reference(s) in the initial communication received from the user. As such, the system may be able to take part in two-way communication (e.g., with multiple replies/communication exchanges if needed) with the user if doing so may facilitate the system in understanding the command (or question) and/or the reference.

In some embodiments, the system (and/or an analysis engine and/or a cognitive module utilized thereby) utilizes a service that is associated with a calendar (or schedule) that may extract events therefrom (and/or from the user's devices), perform historical data monitoring, and store such data in a database (e.g., on the cloud), which may be tagged with relevant information. Such may be performed to create indexed and/or searchable metadata that may be associated with events or actions (or generated responses).

When a communication is provided by a user, the system (and/or a correlation engine utilized thereby) may extract metadata from the communication and match it to the stored metadata (and/or search for similar data on the database) by, for example, separating the reference to the previously generated response from the rest of the communication. The system may assist in this process by describing previously tagged items or events. The other portions of received communications (i.e., the portions besides the reference) may be analyzed to support semantic similarity searches (e.g., mention detected algorithm, embedding and generation process, etc.).

As mentioned above, in some embodiments, the system may utilize various data sources (e.g., associated with received communications, executed responses, and/or individuals) to perform the management of voice response systems as described herein. The data source(s) utilized may include, for example, any available data sources (perhaps utilized by and/or stored on computing devices) associated with the user(s) (i.e., the individual providing the communication) and/or other individuals associated with the communication (e.g., individuals and/or executed responses referenced by the communication). For example, in some embodiments, a profile (e.g., a cognitive profile) for the user(s) (i.e., the user providing the command and/or other individuals) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., communications provided to voice response systems, phone calls, video calls, text messaging, emails, in person/face-to-face conversations, etc.), a profile of (or basic information about) the user (e.g., job title, place of work, length of time at current position, family role, use preferences, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

In some embodiments, some of the data utilized is detected by sensors, such as cameras, microphones, biometric sensors, motion sensors, and wireless transceivers (e.g., wireless communications to detect the presence of computing devices), which may be integrated into a computing device associated with the voice response system (e.g., a mobile phone) or another computing device (e.g., a wearable device, such as a smart watch) and/or separate from such devices (e.g., security cameras).

In some embodiments, the methods and systems described herein utilize a cognitive analysis that is performed on the available data sources. The cognitive analysis may also include classifying natural language, analyzing tone, and analyzing sentiment (e.g., scanning for keywords, key phrases, etc.) with respect to, for example, communications sent to and/or received/detected by voice response systems and/or available data sources. In some embodiments, natural language processing (NLP), Mel-frequency cepstral coefficients (MFCCs), and/or region-based convolutional neural network (R-CNN) pixel mapping (e.g., for images/videos sent to or utilized by voice response systems), as are commonly understood, are used. Over time, the methods and systems described herein may determine correlations (or insights) between communications (e.g., voice and/or text-based communications) received by voice response systems and responses generated/executed by voice response systems, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of voice response system operation as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot (or voice response system), an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing a voice response system by one or more processors is provided. At least one communication from an individual is received. A reference to a previous response executed by a voice response system is identified within the at least one received communication. A response to the at least one received communication is determined based on the previous response executed by the voice response system. A signal representative of the determined response may be generated.

A request for clarification of the reference to the previous response executed by the voice response system may be provided to the individual. A reply to the request may be received from the individual. The determining of the response may be further based on the received reply. The determining of the response may be performed utilizing a cognitive analysis.

The voice response system may be caused to execute the determined response. However, in some embodiments, a second voice response system may be caused to execute the determined response.

The determined response may include an action performed by a computing device, and the action may be caused to be performed by the computing device. The determined response may include an auditory response, and the auditory response may be caused to be rendered by a speaker.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
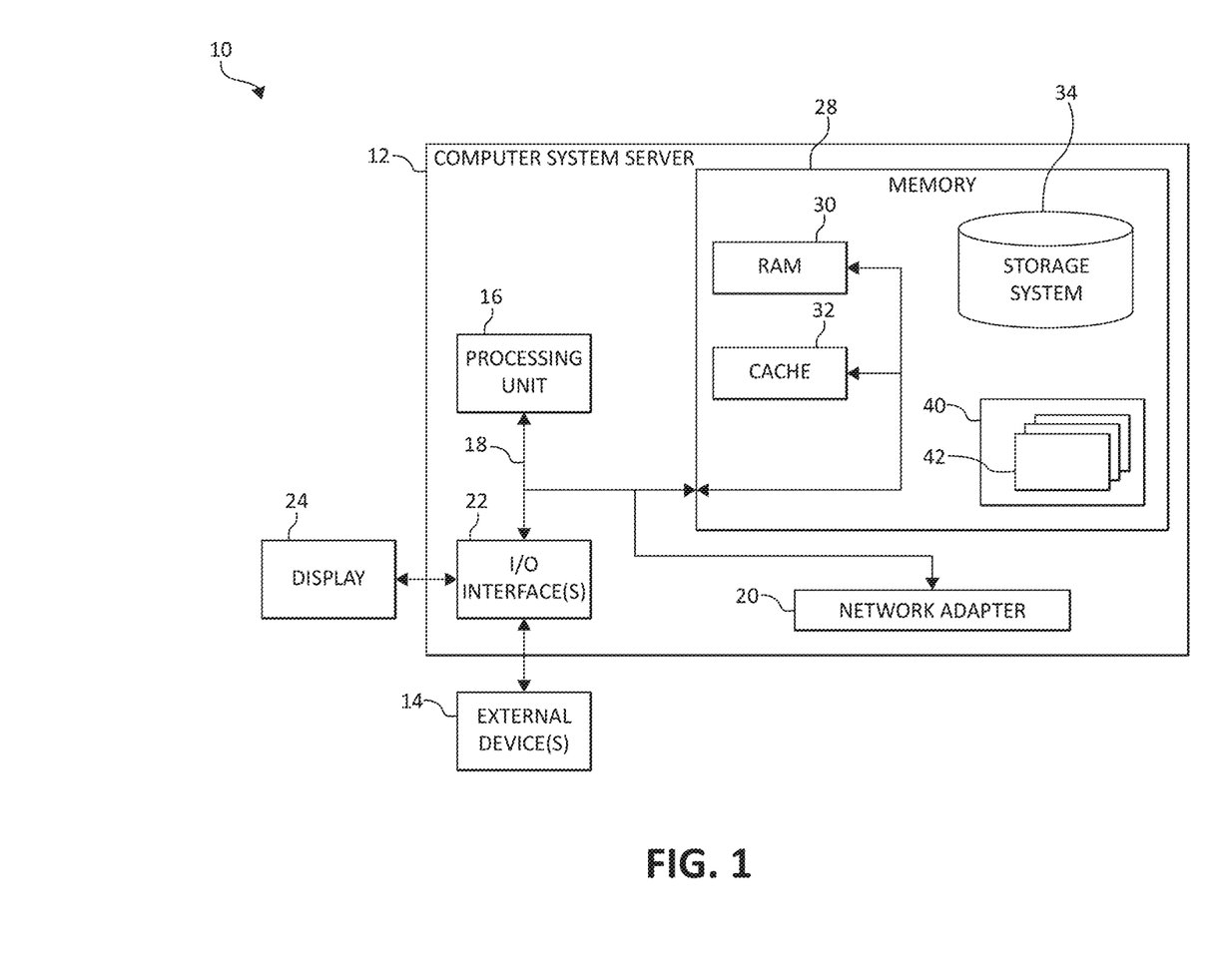
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any other computing node utilizing a chatbot and/or in/through which a chatbot (or voice response system) may be implemented. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
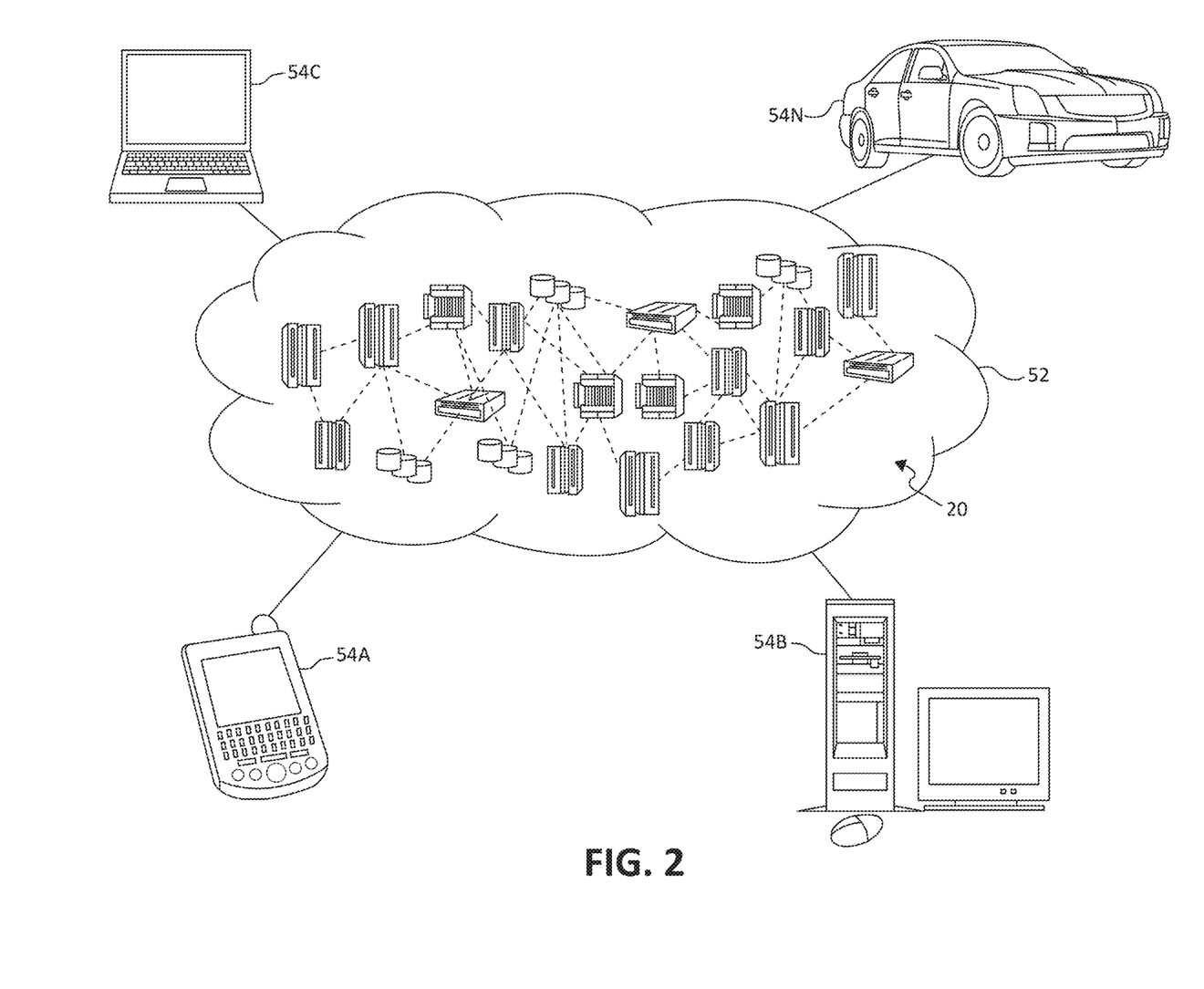
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
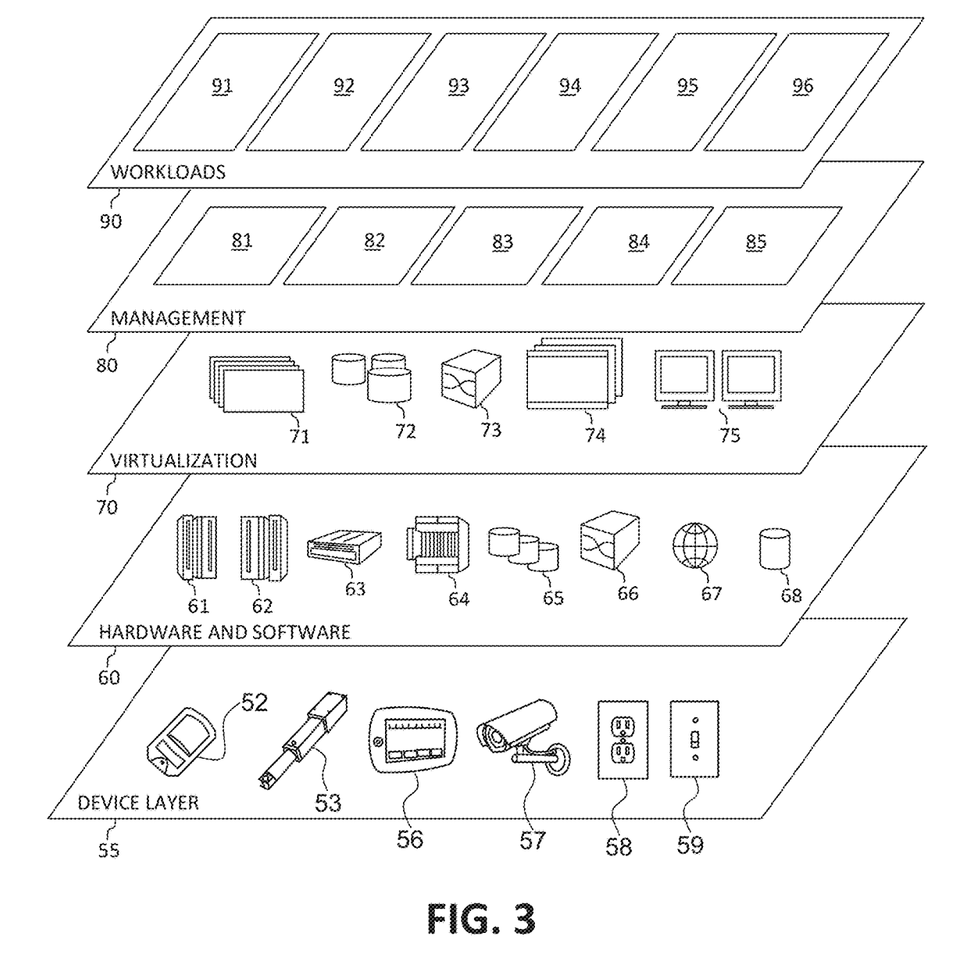
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing voice response systems (and/or the operation thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems are provided that, for example, manage (or control) voice response systems (or chatbots) in such a way as to identify and/or understand references to previously generated (e.g., by the same chatbot or another chatbot) responses included in received communications (e.g., voice communications and/or text-based communications) and generate responses (e.g., voice replies, actions, etc.) based on previously generated responses and/or data sources associated with the previously generated responses (and/or the received communications and/or individuals).

Figure 4:
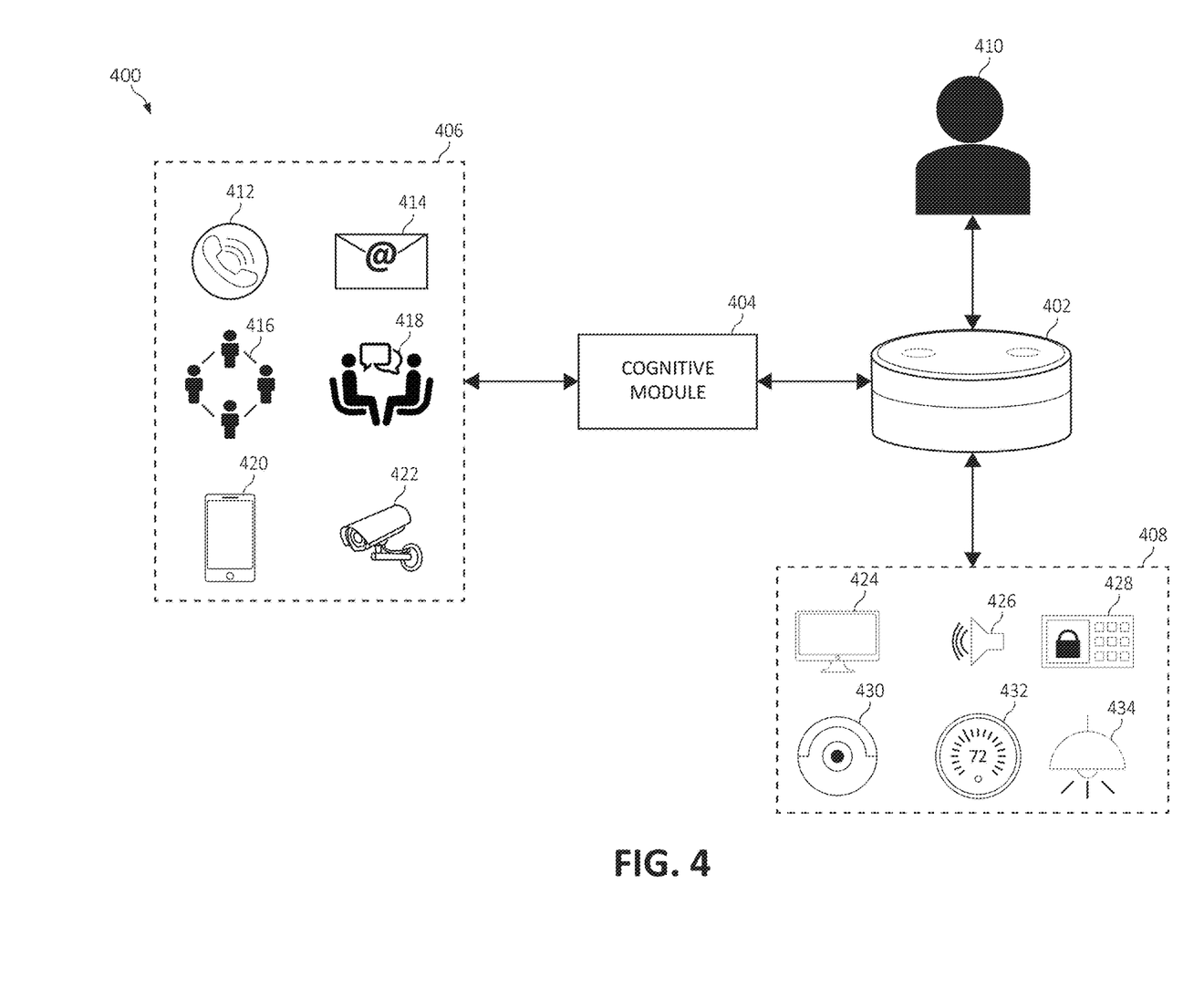
FIG. 4 is a simplified block diagram of a computing environment according to an embodiment of the present invention FIG. 5 a block diagram/flow chart of a method for managing voice response systems according to an embodiment of the present invention.

FIG. 4 illustrates an exemplary computing environment (or system) 400 according to some embodiments of the present invention. The environment 400 includes a chatbot device 402, a cognitive module (or control system) 404, data sources 406, and computing (and/or IoT) devices 408. The chatbot device 402 may be any suitable computing node through which a user may interact with a chatbot (or voice response system), such as a stand alone/dedicated chatbot device, a mobile electronic device (e.g., a mobile phone, tablet device, laptop computer, etc.), a desktop PC, a vehicular computing system, etc. The chatbot device 402 may be able to receive or detect communications from a user 410 via, for example, a microphone (e.g., voice communications) and/or a keyboard (e.g., text-based communications).

The cognitive module 404 may include (and/or be implemented with) any suitable computing device or system, such as those described above, and may be configured to perform the management of chatbots (or voice response systems), and any associated cognitive analysis, as described herein. The cognitive module 404 may be in operable communication with the chatbot device 402 and the data sources 406, and in some embodiments, the IoT devices 408 (e.g., through the chatbot device 402 and/or directly). Although the cognitive module 404 is shown as a separate component in FIG. 4, it should be understood that in some embodiments the cognitive module 404 may be integrated into another computing device (e.g., the chatbot device 402, a mobile electronic device, etc.).

The data sources 406 may include multiple data sources that are associated with a user and/or previously responses executed by the chatbot device 402 and/or other chatbot (or voice response) systems. In the example shown in FIG. 4, the data sources 406 include telephone conversations 412, email(s) 414, social media activity 416, in-person conversations 418, a mobile electronic device 420, and a sensor (e.g., a camera and/or microphone) 422. As such, the data sources 406 may include particular types of data associated with the user (e.g., emails, social media posts, etc.) and/or devices that may be utilized to collect or monitor data associated with the user. It should be understood that the data sources 412-422 shown in FIG. 4 are merely intended as examples, and other/additional data sources may be utilized in some embodiments, such as those described above (e.g., medical records, GPS data, etc.). Also, as mentioned above, the data sources 406 may include data related to responses (e.g., auditory responses, actions performed, etc.) generated by the chatbot device 402 and/or other chatbot (or voice response) systems. Data from the data sources 406 may be stored in one or more databases (e.g., on the cloud) and/or within any other suitable computing devices.

The computing (and/or IoT) devices 408 may include any devices that may be utilized by the system to generate responses (e.g., render auditory responses, perform various actions, etc.). In the depicted embodiment, the devices 408 include a (smart) television 424, a speaker 426, a security system 428, an automated vacuum cleaner 430, a thermostat 432, and a lighting system 434. In some embodiments, each of the devices 424-434 may be positioned (or located) in a vicinity (e.g., within the same building or room) of the chatbot device 402 (e.g., in embodiments in which the chatbot device 402 is stationary) or may be remote from the chatbot device 402 (e.g., in embodiments in which the chatbot device 402 includes a mobile electronic device). As one example, the devices 424-434 may be located at a residence (e.g., house or apartment) of the user 410 and utilized by the chatbot device 402 (and/or the cognitive module 404) to execute various types of commands (e.g., play a movie on the television 424, play music or render an auditory response with the speaker 424, control the security system 428, clean the floors with the vacuum 430, change/set the temperature with the thermostat 432, adjust the lighting with the lighting system 428, etc.). It should be noted that some of the devices 424-434 may be integrated with other components or systems. For example, the speaker 426 may be integrated with the chatbot device 402, the television 424, or a music/sound system.

Still referring to FIG. 4, in some embodiments, when the user 410 provides a communication (e.g., a voice communication) to the chatbot device 402, the cognitive module 404 may analyze the received communication and/or identify references to previously executed responses within the communication. The cognitive module 404 utilizes the data sources 406, in particular, data associated with previously received communications and/or previously generated or executed responses (e.g., actions performed utilizing one or more of the devices 408, an auditory response, etc.), to determine a response to the received communication. After the response is executed, feedback provided by the user (e.g., via detecting/monitoring the user's 410 behavior/actions and/or explicit feedback provided in response to queries) may be used to improve the performance of the system over time (e.g., with respect to the same user or other users).

Figure 5:
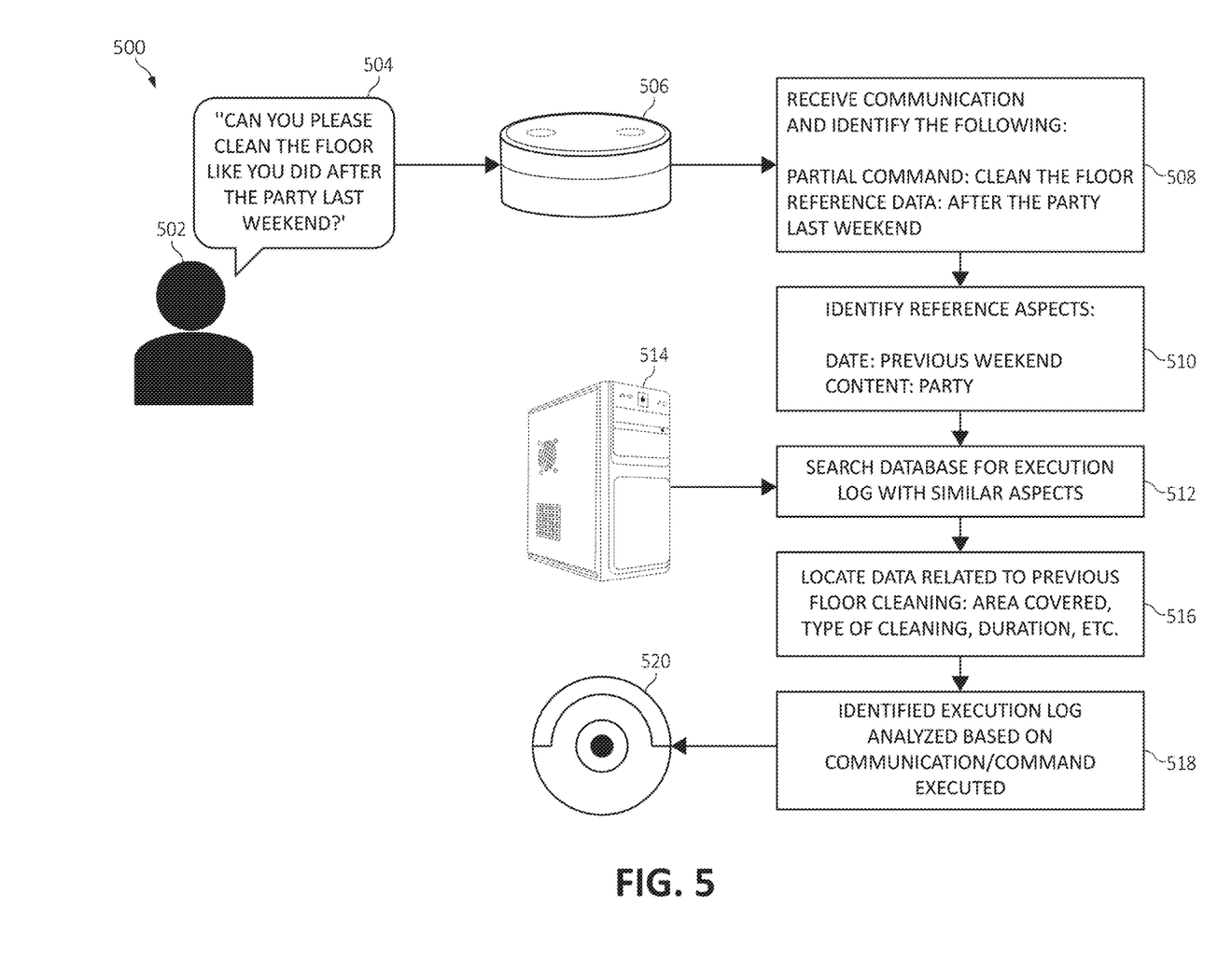

FIG. 5 illustrates a method 500 for managing voice response systems according to some embodiments of the present invention. The method 500 may be implemented, for example, by and/or within the environment 400 shown in FIG. 4. As shown in FIG. 5, a user 502 provides a communication (e.g., a voice communication) 504 that is detected or received by a chatbot device 506. In the depicted embodiment, the voice communication 504 includes a command or request for the system to clean the floor (e.g., of the user's residence). In particular, the voice communication 504 is spoken as "Can you please clean the floor like you did after the party last weekend?"

At block 508, the system (and/or the chatbot device 506) receives the communication and identifies different portions thereof. For example, the system may identify a partial command of "clean the floor" and a reference (or reference data) of "after the party last weekend." At block 510, aspects or dimensions of the reference are identified. In particular, the date corresponding to the previous weekend and the content of the reference (e.g., the party and/or the time of the party and/or the time when the floor was previously cleaned) are identified. At block 512, a database 514 (e.g., on the cloud, a local device/server, etc.) is search for an execution log for a previously executed action with aspects similar to those of the received communication 504 (e.g., cleaning the floor on the day of the party after the party ended). At block 516, when the appropriate data is located within the execution log, additional information related to the previous executed action is retrieved, such as the area covered (e.g., which rooms/areas of the residence were vacuumed), the type of cleaning (e.g., dry, wet, type of detergent, etc.), the duration of the cleaning/vacuuming, etc. At block 518, the identified execution log is analyzed based on the received communication to verify the type of action to be performed, and an appropriate response (or command) is generated/executed. In the depicted embodiment, the generated command includes causing an automated vacuum cleaner 520 to vacuum the floor in the same manner as was previously performed (e.g., after the party that took place the previous weekend).

In some embodiments, the methods and system described herein may be implemented utilizing the following steps. As described above, any suitable computing device may be used.

When an IoT device (or computing node) is performing or executing a command (or associated action), the device (and/or another computing system) captures and/or creates an execution log, including the date and time of the execution of the command. In the example of an automated vacuum cleaner cleaning a floor, the execution log may include, for example, area covered, speed of rotation (e.g., of bristles), type and quantity of chemical(s) (e.g., detergents) used, direction/path of movement, etc. Commands may be provided to specifically tag this data to facilitate locating/identifying it when later commands are received. For example, when using the vacuum to clean a residence, the user may desire to have a particular area (e.g., a rug) cleaned in a different manner (e.g., at a lower speed, at a different height, etc.). When such an command is provided, the user may provide an explicit instruction indicating such, along with whether or not such a parameter should be used in the future (e.g., "new vacuum rule" vs. "one time change").

Additional devices (e.g., sensors) may be utilized to gather information related to the actions being performed by particular devices and perhaps make changes to future executions of the actions. Such information may include biometric data of surrounding users/individuals, location information, and event specific information. For example, sensors (e.g., cameras) may be used to monitor the number of times a pet (e.g., a dog) has passed through a particular area since the last time the floor was cleaned by an automated vacuum. If the system determines that such has occurred more than usual, the system may adjust the operation of the vacuum during the next cleaning (e.g., going over the affected area multiple times, at a slower speed, etc.).

Such data may be gathered along with the device name or identifier (e.g., vacuum, television, washing machine, mobile device, etc.), place of user, duration of use, etc. The data may be clustered for multiple dimensions (or aspects, parameter, etc.) such as time, location (e.g., physical location or contextual location), event name, surrounding context (e.g., weather conditions), device name, etc. The data may be stored on any suitable database, such as a home network server or cloud-based server/database, and may be made available for searching when new communications (e.g., voice commands) are received.

When a (new) communication (e.g., a voice command) is received (or detected), the system may analyze the communication to determine if the communication includes any references to previously executed responses (e.g., executed by the same chatbot or another chatbot). Keywords and/or key phrases may be utilized to identify such references. As mentioned above, this may be facilitated by tagging data associated with previously executed responses. For example, if a received voice command calls for the system to clean the floor, if the user has previously specified that a particular area (e.g., a rug) is to be cleaned in a different manner, the system may reply with a question (e.g., auditory response) asking for specific instructions (e.g., "Do you want to change the vacuum height for the living room rug?").

Based on the analysis of the received communication, the system may identify the type of reference information being provided. If the reference includes the name of another individual (or user), such as a friend of the user who provided the communication, the system may attempt to identify the other individual and, if possible, gain access to a database of previously executed responses associated with the other individual (e.g., execution logs of responses previously executed by a chatbot device of the other individual stored on their home network server). Such a process may be facilitated using a social media platform (e.g., to identify friends/contacts of the user). If appropriate, the system may utilize data associated with responses previously executed by the other individual's chatbot system to generate/execute a response to the user's communication.

In some embodiments, the system may segregate received communication into two (or more) parts/portions. One portion may include a general or partial command (e.g., a partial voice command) to generate a response (e.g., execute an action), and another portion may include the reference (or reference data/information), as described above.

The system may search the appropriate database(s) for execution logs that are similar to and/or include the criteria (or aspects, parameters, etc.) included in the received communication, such as date/time, location, event, etc. The identified execution log may be analyzed based on the partial command, and the system may generate an appropriate response (e.g., cause the appropriate action to be executed).

In some embodiments, if the system is not able to identify an appropriate execution log for the reference included in the received communication and/or the reference in ambiguous (e.g., the reference may be referring to more than one previously executed response), the system may provide a notification (e.g., auditory response) to the user, such as a question and/or request for clarification regarding the reference. For example, if the user had the floor cleaned twice on a day referenced in the received communication, and no indication as to which cleaning the user was referencing was included, the system may ask the user to clarify which cleaning they were referencing (e.g., in the morning or at night).

The system may also utilize other data sources, such as cloud-based or online guides, to guide any additional information gathering from the user. For example, if the received communication includes a command to clean the floor, and the user's residence has a rug in a particular area, the system may utilize such data sources to provide suggestions to the user and/or adjust the manner in which the action is to be performed (e.g., an online data source may indicate that vacuums are ideally set to a different height for particular types of rugs).

In some embodiments, the system may utilize feedback from the user to improve the performance of the system over time. For example, after the action is executed, the system may ask the user whether or not the action was performed in a satisfactory manner and/or the system may monitor the user's behavior/reactions (e.g., facial/mood recognition, social media activity, etc.).

Figure 6:
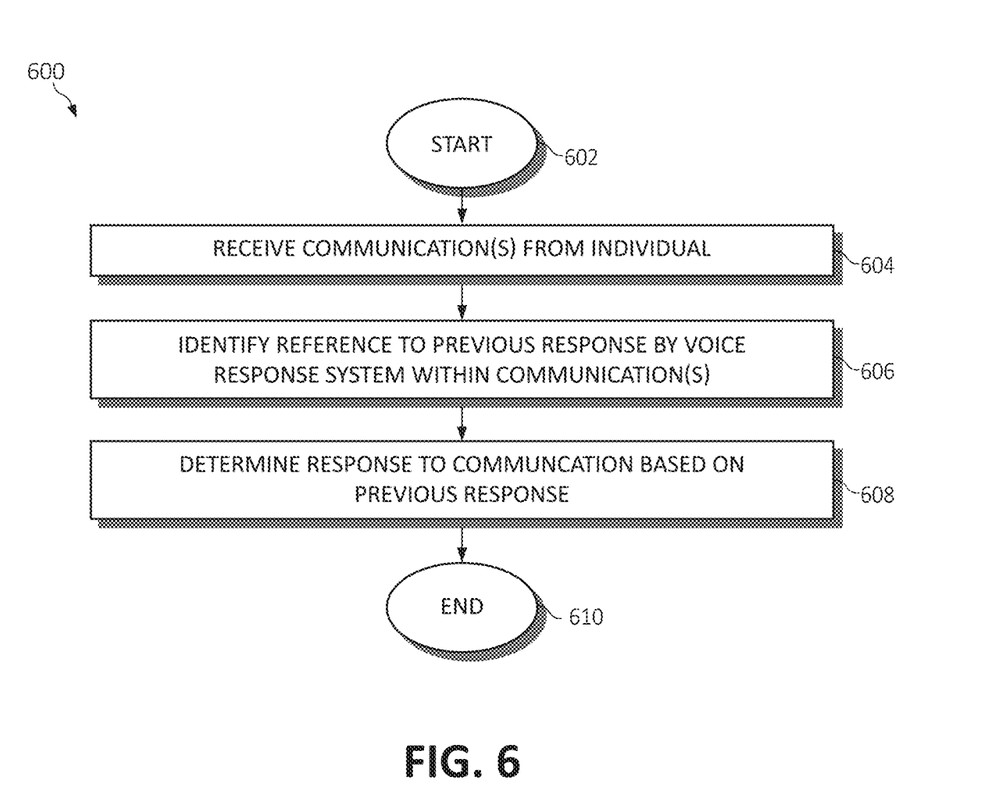
FIG. 6 is a flowchart diagram of an exemplary method for managing voice response systems according to an embodiment of the present invention.

Turning to FIG. 6, a flowchart diagram of an exemplary method 600 for managing (or controlling) voice response systems (or chatbots) (and/or the operation thereof), in accordance with various aspects of the present invention, is provided. Method 600 begins (step 602) with, for example, a voice response system being installed (or otherwise implemented) on or through a computing system/device/node, such as a mobile electronic device (e.g., a mobile phone, tablet device, dedicated chatbot device, etc.).

At least one communication is received from an individual (or user) (step 604). The communication may include a voice communication and/or a text-based communication and be in the form of request/command to have an action performed or a question. In embodiments in which the communication is a voice communication, the communication may be detected (or received) by a microphone (e.g., on and/or utilized by a mobile electronic device, dedicated chatbot device, etc.).

A reference to a previous response executed by a voice response system is identified within the at least one received communication (step 606). The previous response may have been executed by the same voice response system being utilized by the individual who provided the communication(s) or another voice response system. The reference to the previous response may include, for example, a date/time of the previous response, a location, a contextual situation, etc., as described above.

A response to the at least one received communication is determined based on the previous response executed by the voice response system (step 608). The determining of the response may be performed utilizing a cognitive analysis and/or be further based on one more data sources associated with the individual (or another individual) and/or the received communication. The determined response may include an action performed by a computing device and/or an auditory response. The determined response may be similar (or the same) as the previously generated response that is referenced in the received communication.

The voice response system (i.e., the voice response system that executed the previous response) may be caused to execute the determined response. However, in some embodiments, another (or second) voice response system may be caused to execute the determined response. The execution of the determined response may include causing an action to be performed by a computing (or IoT) device and/or causing an auditory response to be rendered by a speaker.

In some embodiments, a request for clarification of the reference to the previous response executed by the voice response system may be provided to the individual. A reply to the request may be received from the individual. The determining of the response may be further based on the received reply.

Method 600 ends (step 610) with, for example, feedback being received (and/or detected) from the individual after the execution of the determined response. The feedback may be utilized to determine responses to subsequent received communications to improve performance of the system over time.

In some embodiments, a method for indexing user commands (or received communications) to voice response systems, using contextual references, is provided. The context of commands may be automatically extracted from one or more data sources, such as time information, location information, event information from the user calendar/schedule, etc. The command and/or the extracted context may be converted into indexable quantities that support similarity searches. The similarity searches may utilize, for example, numeric similarity, cosine similarity between continuous space embeddings, and locality sensitive hashing. The command may be indexed using the indexable quantities in a database that supports similarity searches. The indexed user command may also include the steps taken to execute it.

In some embodiments, a method for retrieving executed user commands containing contextual references is provided. The user command and the contextual references may be automatically distinguished. The command and/or the extracted context may be converted into indexable quantities that support similarity searches. The similarity searches may utilize, for example, numeric similarity, cosine similarity between continuous space embeddings, and locality sensitive hashing. The most similar command may be retrieved (or identified) from a database that supports similarity searches using the indexable quantities. The command may be executed using the steps associated with the most similar command.

In some embodiments, a similarity threshold may be established. The user command may be executed using the steps associated with the most similar command only if the most similar command has a similarity to the user command that exceeds the similarity threshold. If the similar threshold is not exceeded (or met), the command may be executed without utilizing the references to the previously executed action.

In some embodiments, the database (or another data source utilized) includes common commands, common contexts, and suggestions on how to execute the common commands in the common contexts (e.g., online data sources with recommendations on how to perform particular tasks/actions).

In some embodiments, when more than one similar commands are located on the database, one or more questions are provided to the user to provide clarification as to which command is being referenced. The command may then be executed based on one or more replies from the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a voice response system comprising:
   receiving at least one communication from an individual;
   identifying a reference to a previous response executed by a voice response system within the at least one received communication;
   gathering location and event specific data corresponding to the at least one received communication via sensor devices in communication with the voice response system, wherein a cognitive model utilized by the voice response system is trained using the gathered data;
   according to an output of the trained cognitive model, modifying the previously executed response according to the gathered data;
   determining a response to the at least one received communication based on the previous response executed by the voice response system as modified; and
   executing the determined response.

2. The method of claim 1, further comprising:
   providing a request for clarification of the reference to the previous response executed by the voice response system to the individual; and
   receiving a reply to the request from the individual, wherein the determining of the response is further based on the received reply.

3. The method of claim 1, further comprising causing the voice response system to execute the determined response.

4. The method of claim 1, further comprising causing a second voice response system to execute the determined response.

5. The method of claim 1, wherein the determined response includes an action performed by a computing device, and further comprising causing the action to be performed by the computing device.

6. The method of claim 1, wherein the determined response includes an auditory response, and further comprising causing the auditory response to be rendered by a speaker.

7. The method of claim 1, wherein the determining of the response is performed utilizing a cognitive analysis.

8. A system for managing a voice response system comprising:
   at least one processor that receives at least one communication from an individual;

identifies a reference to a previous response executed by a voice response system within the at least one received communication;

gathers location and event specific data corresponding to the at least one received communication via sensor devices in communication with the voice response system, wherein a cognitive model utilized by the voice response system is trained using the gathered data;

according to an output of the trained cognitive model, modifies the previously executed response according to the gathered data;

determines a response to the at least one received communication based on the previous response executed by the voice response system as modified; and executes the determined response.

9. The system of claim 8, wherein the at least one processor further:

provides a request for clarification of the reference to the previous response executed by the voice response system to the individual; and receives a reply to the request from the individual, wherein the determining of the response is further based on the received reply.

10. The system of claim 8, wherein the at least one processor further causes the voice response system to execute the determined response.

11. The system of claim 8, wherein the at least one processor further causes a second voice response system to execute the determined response.

12. The system of claim 8, wherein the determined response includes an action performed by a computing device, and wherein the at least one processor further causes the action to be performed by the computing device.

13. The system of claim 8, wherein the determined response includes an auditory response, and wherein the at least one processor further causes the auditory response to be rendered by a speaker.

14. The system of claim 8, wherein the determining of the response is performed utilizing a cognitive analysis.

15. A computer program product for managing a voice response system by one or more processors, the computer program product comprising a non-transitory computer-readable storage medium having computer-readable program code portions stored therein, the computer-readable program code portions comprising:

an executable portion that receives at least one communication from an individual;

an executable portion that identifies a reference to a previous response executed by a voice response system within the at least one received communication;

an executable portion that gathers location and event specific data corresponding to the at least one received communication via sensor devices in communication with the voice response system, wherein a cognitive model utilized by the voice response system is trained using the gathered data;

an executable portion that, according to an output of the trained cognitive model, modifies the previously executed response according to the gathered data;

an executable portion that determines a response to the at least one received communication based on the previous response executed by the voice response system as modified; and an executable portion that executes the determined response.

16. The computer program product of claim 15, wherein the computer-readable program code portions further include:

an executable portion that provides a request for clarification of the reference to the previous response executed by the voice response system to the individual; and an executable portion that receives a reply to the request from the individual, wherein the determining of the response is further based on the received reply.

17. The computer program product of claim 15, wherein the computer-readable program code portions further include an executable portion that causes the voice response system to execute the determined response.

18. The computer program product of claim 15, wherein the computer-readable program code portions further include an executable portion that causes a second voice response system to execute the determined response.

19. The computer program product of claim 15, wherein the determined response includes an action performed by a computing device, and wherein the computer-readable program code portions further include an executable portion that causes the action to be performed by the computing device.

20. The computer program product of claim 15, wherein the determined response includes an auditory response, and wherein the computer-readable program code portions further include an executable portion that causes the auditory response to be rendered by a speaker.

21. The computer program product of claim 15, wherein the determining of the response is performed utilizing a cognitive analysis.

* * * * *